United States Patent
Ichimaru

[19]

[11] Patent Number: 5,924,703
[45] Date of Patent: Jul. 20, 1999

[54] SUSPENSION CONTROL APPARATUS

[75] Inventor: Nobuyuki Ichimaru, Kanagawa-ken, Japan

[73] Assignee: Tokico Ltd., Kanagawa-ken, Japan

[21] Appl. No.: 08/986,845

[22] Filed: Dec. 8, 1997

[30] Foreign Application Priority Data

Dec. 9, 1996 [JP] Japan ................................ 8-344535

[51] Int. Cl.$^6$ .................................................. B60G 17/00
[52] U.S. Cl. ................................... 280/5.515; 188/266.2; 188/266.1; 701/37
[58] Field of Search ........................ 280/5.5, 5.501–5.507, 280/DIG. 1, 124.1, 124.103–124.106, 5.515, 5.512, 5.513, 5.514, 124.159, 124.161, 124.16; 137/625.64, 625.3, 625.61, 625.69, 596.12; 310/316, 328; 701/37, 38, 39; 267/64.15, DIG. 1, 64.16, 64.17; 188/266.1–266.6, 282.2, 282.3, 281

[56] References Cited

U.S. PATENT DOCUMENTS

| | | | |
|---|---|---|---|
| 4,787,650 | 11/1988 | Doi et al. ................................... | 701/37 |
| 4,957,309 | 9/1990 | Komazawa et al. ........................ | 701/37 |
| 5,004,264 | 4/1991 | Kozaki et al. ......................... | 188/266.2 |
| 5,024,459 | 6/1991 | Kokubo et al. ........................ | 280/5.501 |
| 5,064,032 | 11/1991 | Ashiba . | |
| 5,078,421 | 1/1992 | Kokubo et al. ............................ | 701/37 |
| 5,092,625 | 3/1992 | Kawabata ............................... | 280/5.501 |
| 5,142,475 | 8/1992 | Matsunaga et al. ................... | 280/5.515 |
| 5,205,385 | 4/1993 | Ashiba ................................. | 188/266.5 |
| 5,285,876 | 2/1994 | Shimizu et al. ....................... | 280/5.515 |
| 5,293,969 | 3/1994 | Yamaoka et al. .................... | 188/266.5 |
| 5,361,209 | 11/1994 | Tsutsumi ............................... | 280/5.515 |

*Primary Examiner*—Douglas C. Butler
*Attorney, Agent, or Firm*—Wenderoth, Lind & Ponack, L.L.P.

[57] ABSTRACT

The present invention provides a suspension control apparatus including dither amplitude setting device which is adapted to set the amplitude of the dithering current to be superimposed on the command current is set to a small value in a region in which a damping force generated by the shock absorber changes at a high rate relative to changes in intensity of the current applied to the solenoid. The present invention also provides a suspension control apparatus including dither frequency setting device which is adapted to set the frequency of the dithering current to a high frequency in a region in which a damping force generated by the shock absorber changes at a high rate relative to changes in intensity of the current applied to the solenoid and set the frequency of the dithering current to a low frequency in a region other than the above-mentioned region. The suspension control apparatus of the present invention prevents generation of undesirable noise and vibration while suppressing an increase in hysteresis with respect to a damping force.

6 Claims, 10 Drawing Sheets

SUSPENSION CONTROL APPARATUS

BACKGROUND OF THE INVENTION

The present invention relates to a suspension control apparatus for an automobile.

As a conventional suspension control apparatus, there can be mentioned an apparatus comprising a proportional solenoid valve having a movable member (spool) for controlling an amount of a hydraulic fluid passing therethrough according to a position of the movable member, the movable member being adapted to be displaced according to an intensity of a current applied to the solenoid; a variable damping force generating shock absorber provided between a vehicle body and an axle to generate a damping force which varies depending on the intensity of the current applied to the solenoid, that is, depending on the position of the movable member; and an acceleration sensor for detecting an acceleration of the vehicle body in a vertical direction. In this apparatus, the intensity of the current to be applied to the solenoid (output current) is determined, based on the detection value of acceleration of the acceleration sensor, to thereby generate a desired damping force (for an extension stroke and a compression stroke). Thus, damping of vibration of a sprung mass is effected, thereby improving the ride quality. As a shock absorber applied to the above-mentioned suspension control apparatus, there can be mentioned a shock absorber of a damping force reversing type in which when the damping force for the compression stroke is small, the damping force for the extension stroke changes from a large value to a small value and when the damping force for the extension stroke is small, the damping force for the compression stroke changes from a small value to a large value.

In the above-mentioned suspension control apparatus, the current to be applied to the solenoid is obtained in a form such that an oscillating current (dithering current, which is hereinafter frequently referred to simply as "dither") is superimposed on a command current having a desired intensity (a target current having an intensity equal to an average intensity of the current to be applied to the solenoid) which is determined from the detection value of acceleration of the acceleration sensor. The dithering current is obtained on the basis of a PWM (pulse width modulation) signal and has a frequency which is relatively high (but low as compared to the frequency of the PWM signal). Due to the dithering current, the movable member oscillates slightly (dithers) about a predetermined position corresponding to the intensity of the command current, so that displacement of the movable member can be easily performed, thereby improving responsivity in controlling a damping force.

A technique of superimposing a dithering current on a command current has been known and is disclosed in, for example, Unexamined Japanese Patent Application Public Disclosure No. 8-303628. From the viewpoint of achieving smooth displacement of the movable member, it is advantageous to slightly oscillate the movable member by utilizing a dithering current. However, a rate of change in damping force relative to slight changes in position of the movable member varies, depending on the position of the movable member. When the movable member is located at a position in a range such that the rate of change in damping force is high, a damping force changes by a large amount at a high frequency due to slight oscillation of the movable member (caused by the dithering current). This leads to a problem, such as generation of undesirable noise and vibration.

BRIEF SUMMARY OF THE INVENTION

In order to solve the above-mentioned problem, the present invention has been made. In one aspect of the present invention, there is provided a suspension control apparatus comprising:

a proportional solenoid valve having a solenoid and a movable member, the movable member being adapted to be displaced according to an intensity of a current applied to the solenoid;

a variable damping force generating shock absorber provided between a vehicle body and an axle to generate a damping force which varies depending on a position of the movable member;

dither generating means for generating a dithering current to be superimposed on a command current corresponding to a desired damping force, the dithering current and the command current constituting the current applied to the solenoid and the movable member being adapted to oscillate at a position corresponding to an intensity of the command current and at an amplitude corresponding to an amplitude of the dithering current; and dither amplitude setting means adapted to set the amplitude of the dithering current to a small value, in a region where the damping force generated by the variable damping force generating shock absorber changes at a high rate relative to changes in intensity of the current applied to the solenoid.

In another aspect of the present invention, there is provided a suspension control apparatus comprising:

a proportional solenoid valve having a solenoid and a movable member, the movable member being adapted to be displaced according to an intensity of a current applied to the solenoid;

a variable damping force generating shock absorber provided between a vehicle body and an axle to generate a damping force which varies depending on a position of the movable member;

dither generating means for generating a dithering current to be superimposed on a command current corresponding to a desired damping force, the dithering current and the command current constituting the current applied to the solenoid and the movable member being adapted to oscillate at a position corresponding to an intensity of the command current and at a frequency corresponding to a frequency of the dithering current; and dither frequency setting means adapted to set the frequency of the dithering current to a high frequency, in a region where the damping force generated by the variable damping force generating shock absorber changes at a high rate relative to changes in intensity of the current applied to the solenoid and set the frequency of the dithering current to a low frequency, in a region other than the region where the damping force generated by the variable damping force generating shock absorber changes at a high rate relative to changes in intensity of the current applied to the solenoid.

The foregoing and other objects, features and advantages of the present invention will be apparent from the following detailed description and appended claims taken in connection with the accompanying drawings.

DETAILED DESCRIPTION OF THE INVENTION

Figure 9:
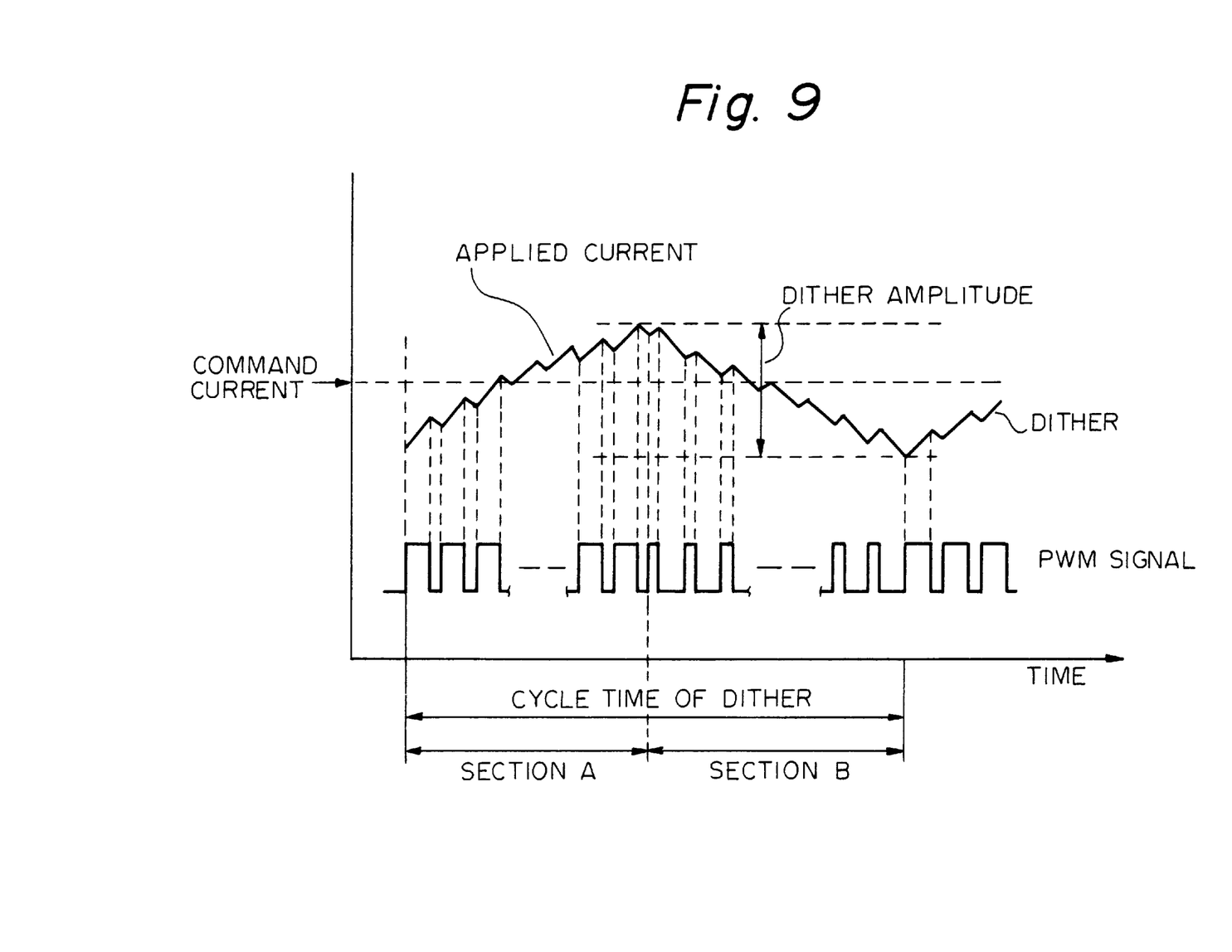
FIG. 9 shows typical examples of waveforms explaining a relationship between a PWM signal and a dithering current.
Figure 10:
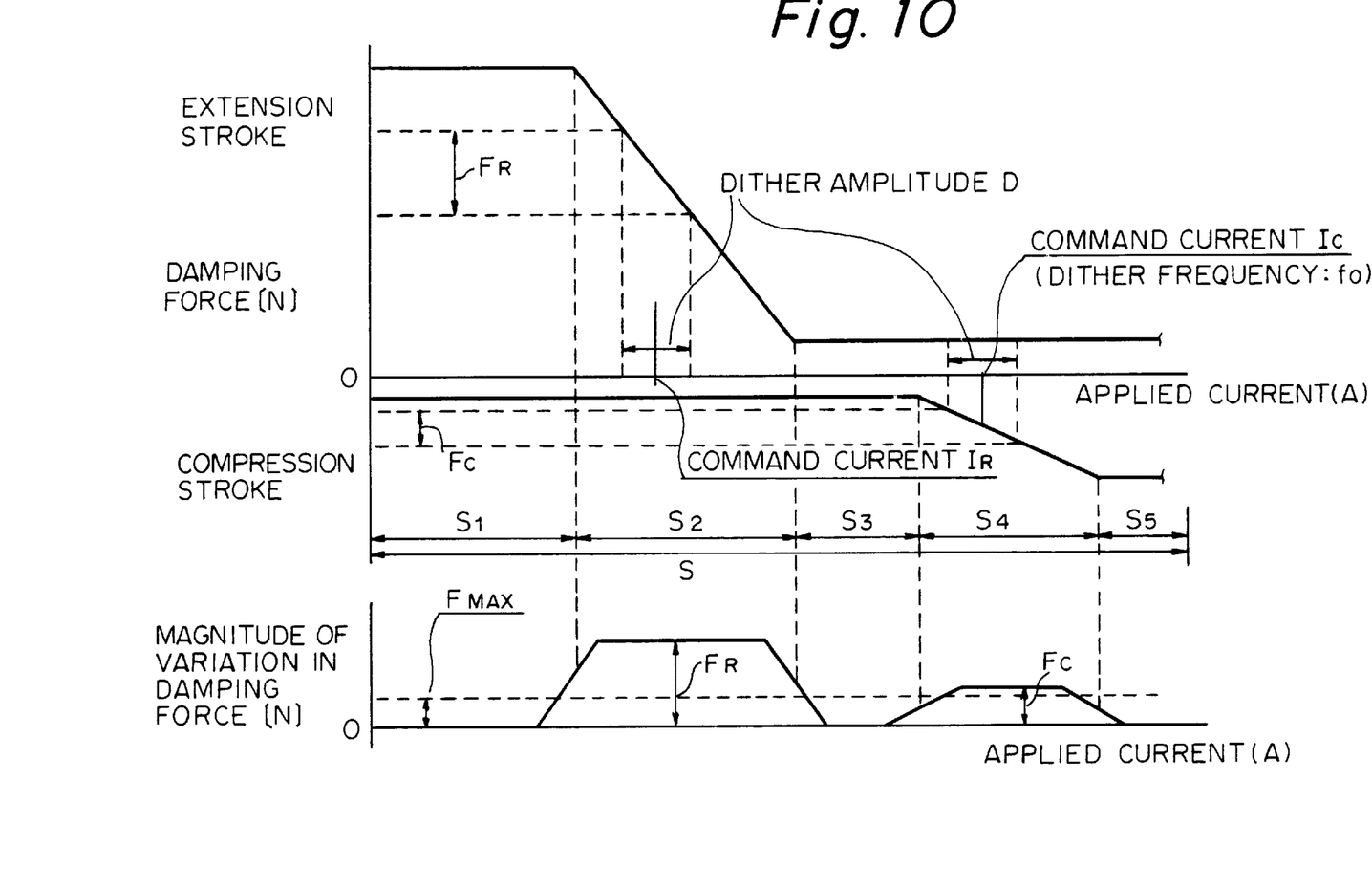
FIG. 10 shows a graph showing damping force variation characteristics (relative to a current intensity) in a typical suspension control apparatus.

Before explaining embodiments of the present invention, for easy understanding of the present invention, one example of obtaining a current in a form such that a dithering current is superimposed on a command current is explained, with reference to FIGS. 9 and 10. The current in a form such that a dithering current is superimposed on a command current is obtained, for example, in a manner as mentioned below.

A switching means (transistor) is provided between the solenoid and a power source. The switching means is adapted to be switched on and off in response to the PWM signal. Due to a transient phenomenon, when the PWM signal is of a high level [for example, when a duty ratio of the PWM signal is 75% (that is, when the transistor is switched on during a period of 75% of a cycle time of the PWM signal and switched off during a period of 25% of a cycle time of the PWM signal)], the current intensity applied to the solenoid gradually increases. Subsequently, when the PWM signal is of a low level [for example, the duty ratio of the PWM signal is 25% (that is, when the transistor is switched on during a period of 25% of a cycle time of the PWM signal and switched off during a period of 75% of a cycle time of the PWM signal)], the current intensity applied to the solenoid gradually decreases. Illustratively stated, as shown in FIG. 9, when the duty ratio of the PWM signal is as high as, for example, 75% (section A), a rate of increase in current intensity applied to the solenoid (when the transistor is switched on during a period of 75% of a cycle time of the PWM signal) is larger than a rate of decrease in current intensity applied to the solenoid (when the transistor is switched off during a period of 25% of a cycle time of the PWM signal). Consequently, in section A, the current intensity applied to the solenoid increases at each cycle of the PWM signal. (Hereinafter, for the sake of convenience, the duty ratio when the intensity of current applied to the solenoid increases at each cycle of the PWM signal is referred to simply as "increase duty ratio"). On the other hand, when the duty ratio of the PWM signal is as low as, for example, 25% (section B), a rate of decrease in current intensity applied to the solenoid (when the transistor is switched off during a period of 75% of a cycle time of the PWM signal) is larger than a rate of increase in current intensity applied to the solenoid (when the transistor is switched on during a period of 25% of a cycle time of the PWM signal). Consequently, in section B, the current intensity applied to the solenoid decreases at each cycle of the PWM signal. (Hereinafter, for the sake of convenience, the duty ratio when the intensity of current applied to the solenoid decreases at each cycle of the PWM signal is referred to simply as "decrease duty ratio"). The duty ratio is switched between the increase duty ratio and the decrease duty ratio at each predetermined duty-ratio-switching cycle (having a cycle time equal to ½ of a cycle time of a dithering current). Thus, a dithering current having a predetermined amplitude and a frequency which is relatively high (but low as compared to the frequency of the PWM signal, a cycle time being equal to twice a cycle time of the duty-ratio-switching cycle) is obtained, and the PWM signal is adjusted so that an average intensity of the dithering current corresponds to the intensity of the command current (target current). The amplitude of the dithering current can be increased by increasing a difference between the increase duty ratio and the decrease duty ratio at the start or completion of displacement of the movable member or increasing a period of time in each of sections A and B. Hereinafter, for the sake of convenience, the amplitude of the dithering current and the frequency of the dithering current are frequently referred to simply as "dither amplitude" and "dither frequency", respectively.

In a suspension control apparatus in which the current in a form such that a dithering current is superimposed on a command current is utilized, as shown in FIG. 10, each of an amplitude D and a frequency $f_o$ of the dithering current is set to a predetermined value, and the intensity of the command current is changed according to a desired damping force. Thus, a current having a desired intensity is applied to the solenoid (the current to be applied to the solenoid is hereinafter frequently referred to simply as "applied current"), to thereby obtain a damping force which varies as shown in an upper graph in FIG. 10.

In FIG. 10, a command current intensity region $S_2$ is a region in which while the damping force for the compression stroke is small, the damping force for the extension stroke changes from a large value to a small value at a predetermined rate, and the intensity of command current (the average intensity of applied current) is relatively low (hereinafter, referred to simply as "second region $S_2$" for the sake of convenience). A command current intensity region $S_4$ is a region in which while the damping force for the extension stroke is small, the damping force for the compression stroke changes from a small value to a large value at a predetermined rate, and the intensity of command current (the average intensity of applied current) is relatively high (hereinafter, referred to simply as "fourth region $S_4$" for the sake of convenience). A command current intensity region $S_1$ is a region in which the intensity of command current (the average intensity of applied current) is lower than that in the second region $S_2$ (hereinafter, referred to simply as "first region $S_1$" for the sake of convenience), and a command current intensity region $S_3$ is a region between the second region $S_2$ and the fourth region $S_4$ (hereinafter, referred to simply as "third region $S_3$" for the sake of convenience). A command current intensity region $S_5$ is a region in which the intensity of command current (the average intensity of applied current) is higher than that in the fourth region $S_4$ (hereinafter, referred to simply as "fifth region $S_5$" for the sake of convenience).

In each of the second region $S_2$ and the fourth region $S_4$, a magnitude of variation in damping force (an amount of change in damping force) relative to changes in intensity of the applied current is large, as compared to those in the other regions (the first region $S_1$, the third region $S_3$ and the fifth region $S_5$). Further, in this example, a magnitude $F_R$ of variation in damping force in the second region $S_2$ is larger than a magnitude $F_c$ of variation in damping force in the fourth region $S_4$ ($F_R > F_c$). For the sake of convenience, a command current having an intensity in the second region $S_2$ and a command current having an intensity in the fourth region $S_4$ are hereinafter frequently referred to simply as "command current $I_R$" and "command current $I_c$", respectively.

In the above-mentioned conventional suspension control apparatus, the current to be applied to the solenoid is obtained in a form such that the dithering current having the predetermined amplitude D and the predetermined frequency $f_o$ is superimposed on the command current. Therefore, when the intensity of command current (the intensity of applied current) is in the second region $S_2$ or the fourth region $S_4$, the amount of change in damping force generated by the shock absorber due to the dithering current (hereinafter, frequently referred to simply as "magnitude of variation in damping force") is larger than those in the other regions (the first region $S_1$, the third region $S_3$ and the fifth region $S_5$). When the magnitude $F_R$ of variation in damping force in the second region $S_2$ and the magnitude $F_c$ of variation in damping force in the fourth region $S_4$ exceed a predetermined value $F_{MAX}$ as an allowable maximum magnitude of variation in damping force ($F_R > F_c > F_{MAX}$), problems occur, such that undesirable noise and vibration are generated and a desired damping force cannot be obtained.

With respect to the above-mentioned problems, undesirable noise and vibration can be suppressed by setting the dither amplitude to a small value or setting the dither frequency to a high frequency. However, when the dither amplitude is set to a small value or when the dither frequency is set to a high frequency, although undesirable noise and vibration can be suppressed, an increase in hysteresis with respect to a damping force (a lowering of responsivity in controlling a damping force) occurs, thereby lowering the ride quality.

The meaning of "hysteresis with respect to a damping force" is as follows. Hysteresis with respect to a damping force describes a phenomenon whereby to obtain an equal change in damping force when increasing or decreasing a damping force, different intensities of current are required to be applied to the solenoid. Therefore, in a graph showing a damping force—current intensity relationship, in which the abscissa indicates the intensity of current and the ordinate indicates the damping force, a closed curve (hysteresis loop) substantially in the form of a parallelogram is obtained. It is preferred that the size of the hysteresis loop (a difference between an intensity of current required for increasing a damping force to obtain a predetermined amount of change in damping force and an intensity of current required for decreasing a damping force to obtain the same predetermined amount of change in damping force) be suppressed to as low a level as possible.

Hereinbelow, a suspension control apparatus according to a first embodiment of the present invention is explained, with reference to FIGS. 1 to 5, and a suspension control apparatus according to a second embodiment of the present invention is explained, with reference to FIGS. 6 to 8. According to these embodiments of the present invention, there is provided a suspension control apparatus which is capable of preventing generation of undesirable noise and vibration while suppressing an increase in hysteresis with respect to a damping force.

Figure 1:
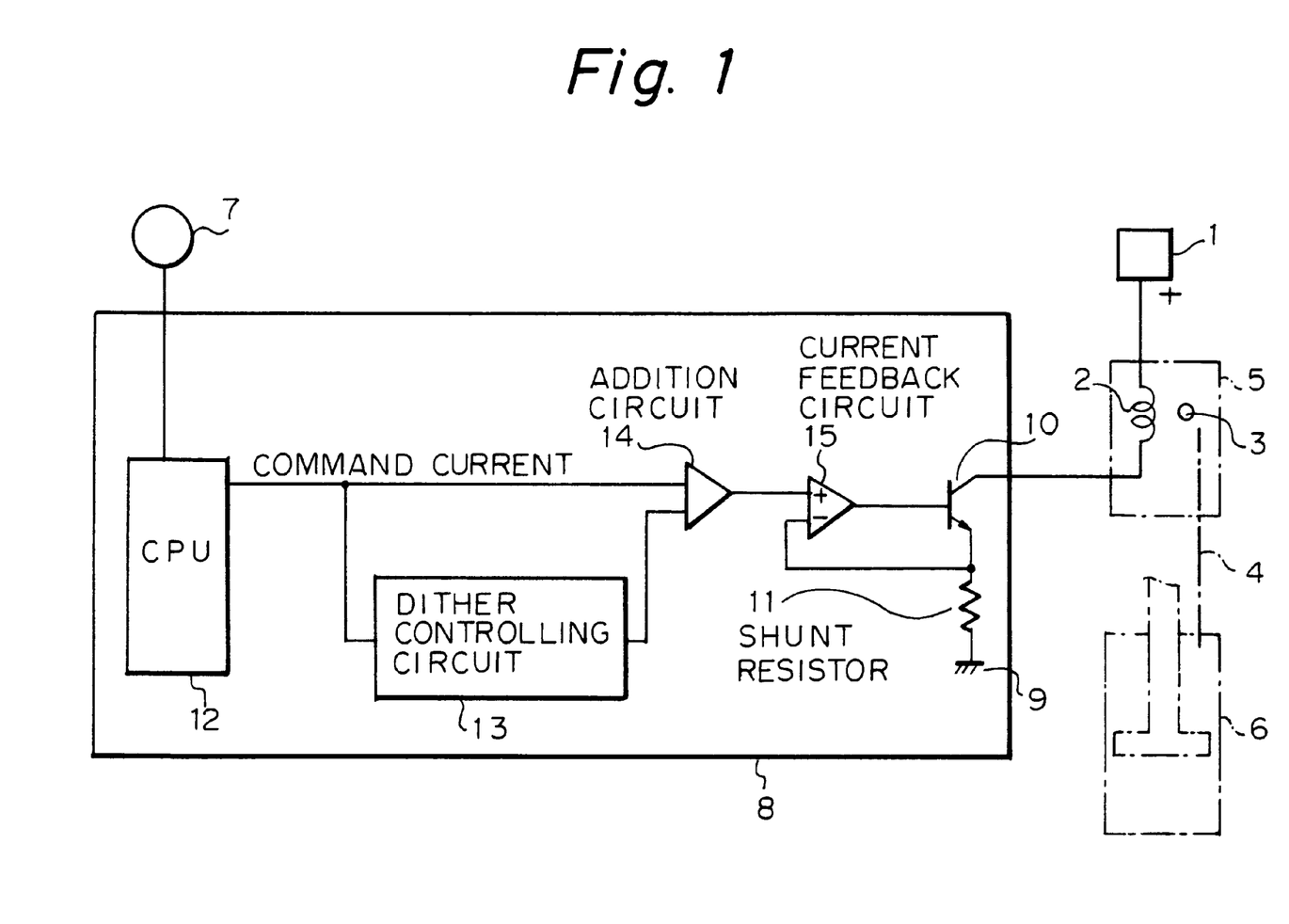
FIG. 1 shows a typical example of a suspension control apparatus according to a first embodiment of the present invention.

As shown in FIG. 1, the suspension control apparatus mainly comprises: a proportional solenoid valve 5 having a solenoid 2 having its one side connected to a battery (power source) 1 and a movable member (spool) 3 adapted to be displaced according to an intensity of a current applied to the solenoid 2, the proportional solenoid valve 5 being adapted to control an amount of an hydraulic fluid 4 passing therethrough according to a position of the movable member 3; a variable damping force generating shock absorber 6 provided between a vehicle body (not shown) and an axle (not shown) to generate a damping force which varies depending on the intensity of the current applied to the solenoid 2, that is, depending on the position of the movable member 3; an acceleration sensor 7 for detecting an acceleration of the vehicle body in a vertical direction; and a controller 8 connected to the solenoid 2 on a side thereof which is not connected to the battery 1.

The controller 8 comprises a transistor 10 and a shunt resistor 11 provided between the solenoid 2 and a ground 9 in this order. The transistor 10 variably controls the intensity of the current to be applied to the solenoid 2. As explained later, the applied current is obtained in a form such that a dithering current is superimposed on a command current having an intensity corresponding to an average intensity of the applied current. The movable member 3 is moved to a position corresponding to the intensity of the command current, so that the variable damping force generating shock absorber 6 generates a desired damping force. Further, due to the dithering current, the movable member 3 oscillates slightly (dithers) around the position corresponding to the intensity of the command current, to thereby improve responsivity of the movable member 3, that is, responsivity of the variable damping force generating shock absorber 6 in controlling a damping force.

The controller 8 further comprises: a CPU 12; a dither controlling circuit (dither generating means and dither amplitude setting means) 13; an addition circuit 14; and a current feedback circuit 15. The CPU 12 determines a value of the intensity of command current suitable for obtaining a desired damping force, based on the detection value of acceleration of the acceleration sensor 7, and outputs the determined value of the intensity of command current to the dither controlling circuit 13 and the addition circuit 14. As explained in detail later, the dither controlling circuit 13 calculates a predetermined value of the dither amplitude, based on the value of the intensity of command current outputted from the CPU 12 and controls the dither amplitude. The addition circuit 14 adds an output value of the dither controlling circuit 13 to the value of the intensity of command current outputted from the CPU 12. The current feedback circuit 15 feeds back a detection value of terminal voltage of the shunt resistor 11 to an output value of the addition circuit 14 to thereby obtain a transistor control signal. The transistor 10 is controlled by the obtained transistor control signal, so that a current in a form such that the dithering current is superimposed on the command current is applied to the solenoid 2.

Figure 5:
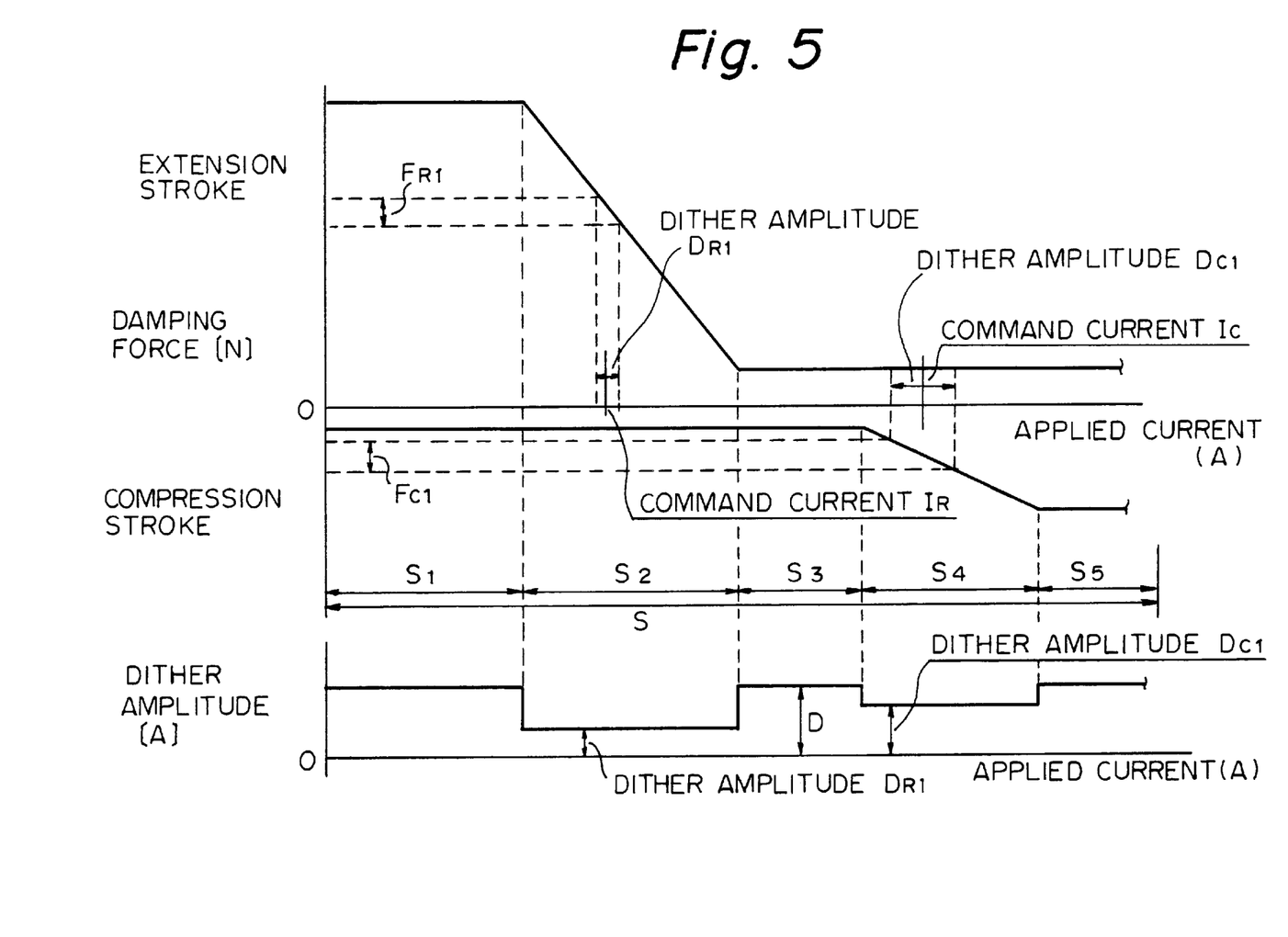
FIG. 5 shows a graph showing damping force characteristics (relative to a current intensity) of the suspension control apparatus of FIG. 1 and a command current intensity—dither amplitude data map corresponding to the above-mentioned damping force characteristics.
Figure 6:
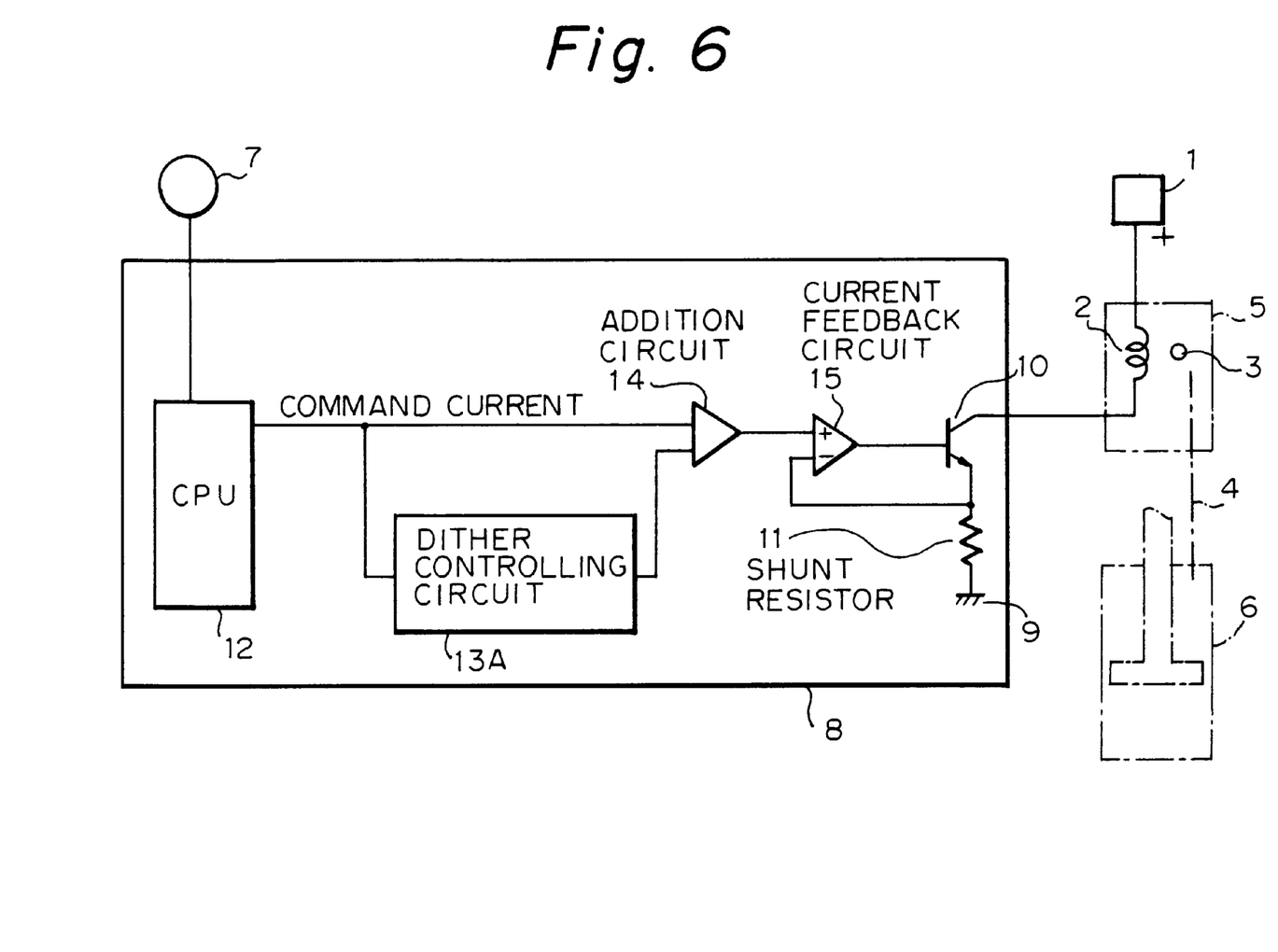
FIG. 6 shows a typical example of a suspension control apparatus according to a second embodiment of the present invention.

The dither controlling circuit 13 stores a command current intensity—dither amplitude data map shown in a lower graph in FIG. 5, which is preliminarily determined by experiments. This command current intensity—dither amplitude data map is determined in a manner as mentioned below, based on the fact that the variable damping force generating shock absorber 6 has damping force characteristics relative to the intensity of command current (the average intensity of applied current) shown in an upper graph in FIG. 5.

That is, in this embodiment, the dither amplitude is set to a small value when the intensity of command current is in the second region $S_2$ or the fourth region $S_4$. For example, when the intensity of command current is in the second region $S_2$, the dither amplitude is set to a value $D_{R1}$ which is smaller than the above-mentioned predetermined dither amplitude D in the conventional suspension control apparatus ($D_{R1}<D$) so that the magnitude $F_{R1}$ of variation in damping force corresponding to the dither amplitude is smaller than the predetermined value $F_{MAX}$ as the allowable maximum magnitude of variation in damping force (see FIG. 10) ($F_{R1}<F_{MAX}$). When the intensity of command current is in the fourth region $S_4$, the dither amplitude is set to a value $D_{C1}$ which is smaller than the predetermined dither amplitude D in the conventional suspension control apparatus ($D_{C1}<D$) so that the magnitude $F_{C1}$ of variation in damping force corresponding to the dither amplitude is smaller than the predetermined value $F_{MAX}$ as the allowable maximum magnitude of variation in damping force ($F_{C1}=F_{R1}<F_{MAX}$).

Incidentally, in the upper graph in FIG. 5, the above-mentioned magnitude $F_{R1}$ of variation in damping force corresponding to the dither amplitude $D_{R1}$ is obtained for the command current $I_R$, and the magnitude $F_{C1}$ of variation in damping force corresponding to the dither amplitude $D_{C1}$ is obtained for the command current $I_C$. In this embodiment, the dither amplitude is set so that the formula $F_{C1}=F_{R1}<F_{MAX}$ with respect to the magnitude of variation in damping force is satisfied. However, because the rate of change in damping force in the fourth region $S_4$ is lower than that in the second region $S_2$, it is possible to set the dither amplitude so that the formula $F_{C1}<F_{R1}<F_{MAX}$ with respect to the magnitude of variation in damping force is satisfied.

The dither controlling circuit 13 utilizes the command current intensity—dither amplitude data map shown in FIG. 5 in a manner as mentioned below, and conducts the following calculations in cooperation with the CPU 12, the addition circuit 14 and the current feedback circuit 15, to thereby generate a dithering current having a controlled amplitude.

Figure 2:
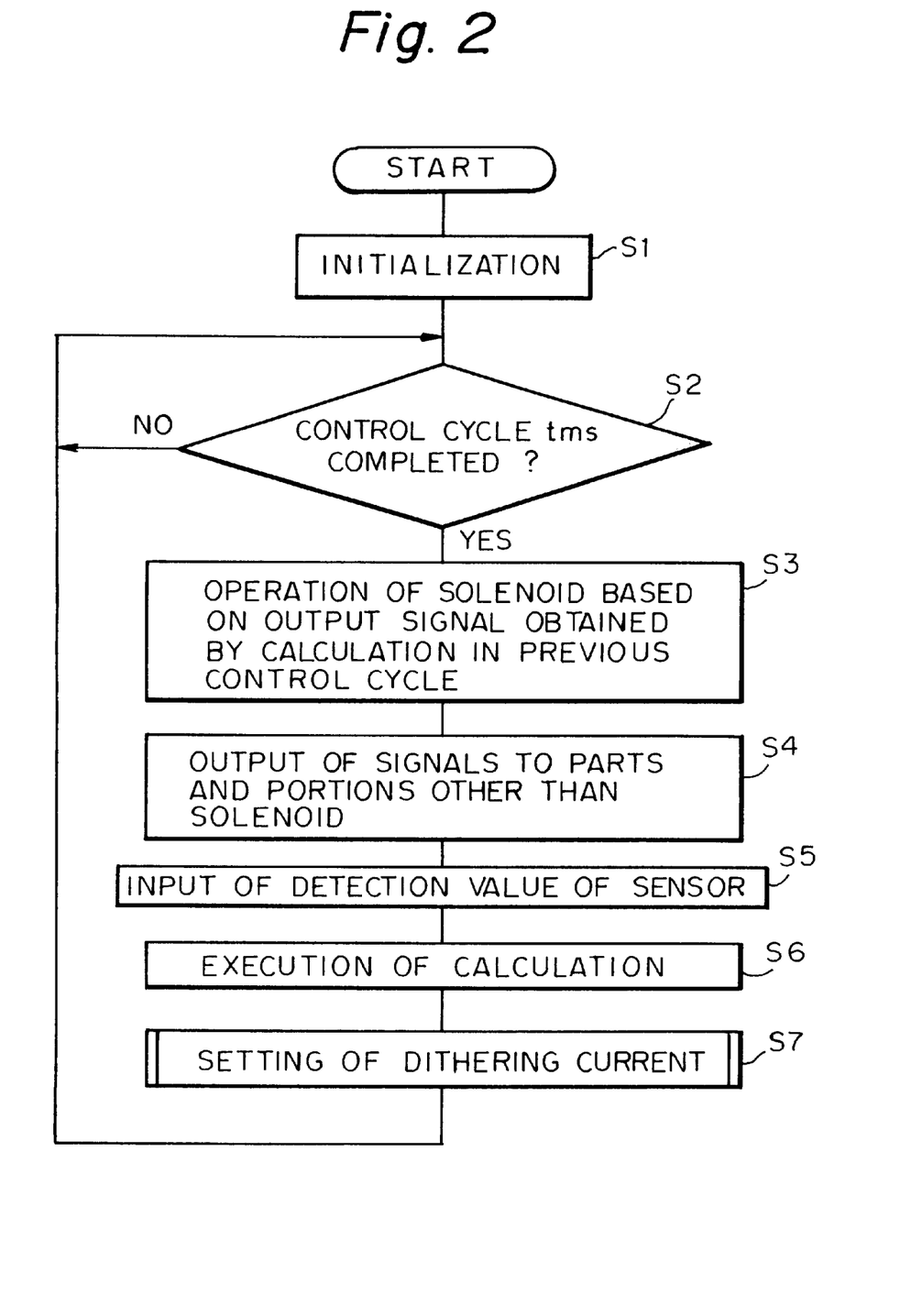
FIG. 2 is a flow chart showing the contents of calculations by a controller shown in FIG. 1.

Hereinbelow, the contents of calculations by the dither controlling circuit 13, the CPU 12, the addition circuit 14 and the current feedback circuit 15 are explained, with reference to FIGS. 2 and 3.

The CPU 12 first effects initialization (step 1), and whether or not a control cycle $t_{ms}$ is completed is judged until the control cycle $t_{ms}$ is completed (step 2). When the control cycle $t_{ms}$ is completed, the solenoid 2 is operated according to an output signal which has been obtained by calculations in a previous control cycle (step 3).

Subsequently, the CPU 12 applies signals to various parts and portions [such as an LED (light emitting diode)] of the suspension control apparatus other than the solenoid 2 (step 4).

At a step 5, the detection value of acceleration of the acceleration sensor 7 is inputted to the CPU 12. At a step 6, the CPU 12 determines a desired damping force for the vehicle body and a command current intensity (an average intensity of the applied current) suitable for generating the desired damping force, based on the detection value of acceleration of the acceleration sensor 7. At a step 7, the dither controlling circuit 13 conducts a subroutine for generating a controlled dithering current.

Figure 3:
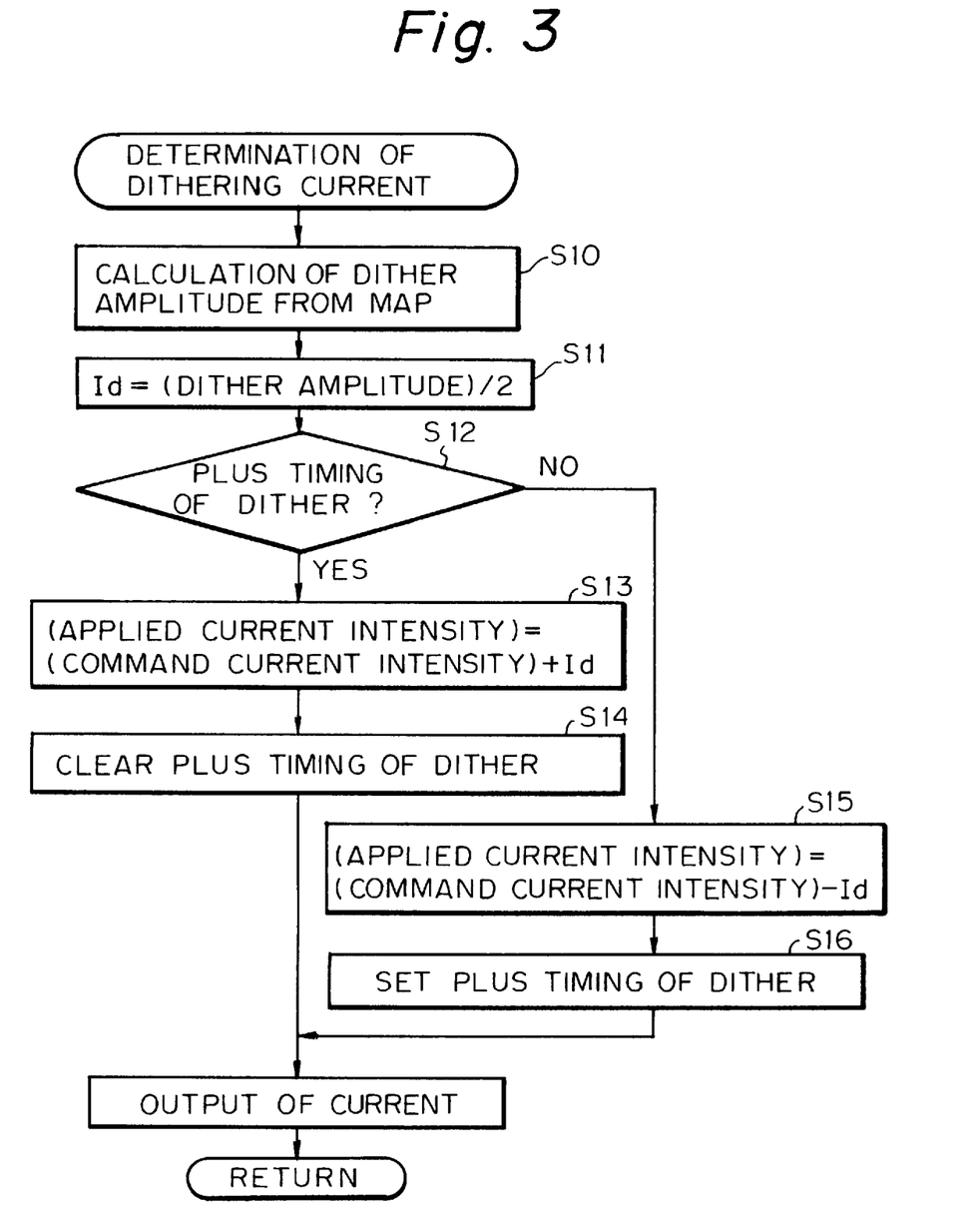
FIG. 3 is a flow chart showing the subroutine for generating a controlled dithering current in the flow chart of FIG. 2.

Next, the subroutine for generating a controlled dithering current is explained, with reference to FIG. 3.

First, the dither amplitude is calculated from the map shown in the lower graph in FIG. 5, based on the intensity of the command current determined at the step 6 (step 10). At a step 11, a value Id to be added to or subtracted from the intensity of the command current is calculated in accordance with the formula Id=(dither amplitude)/2. At a step 12, it is judged whether or not the timing of output of the dithering current for the present control cycle (the present dither controlling cycle) is plus. When the timing of output of the dithering current for the present control cycle (the present dither controlling cycle) is plus, the intensity $I_{out}$ of the applied current (output current) is calculated at a step 13, in accordance with the following formula (1):

$$I_{out}=(\text{command current intensity})+Id \tag{1}$$

At a step 14, the plus timing of output of the dithering current is cleared, so that the timing of output of the dithering current for a subsequent control cycle (a subsequent dither controlling cycle) is minus. When it is judged at the step 12 that the timing of output of the dithering current for the present control cycle (the present dither controlling cycle) is not plus, the intensity $I_{out}$ of the applied current (output current) is calculated at a step 15, in accordance with the following formula (2):

$$I_{out}=(\text{command current intensity})-Id \tag{2}$$

Figure 4:
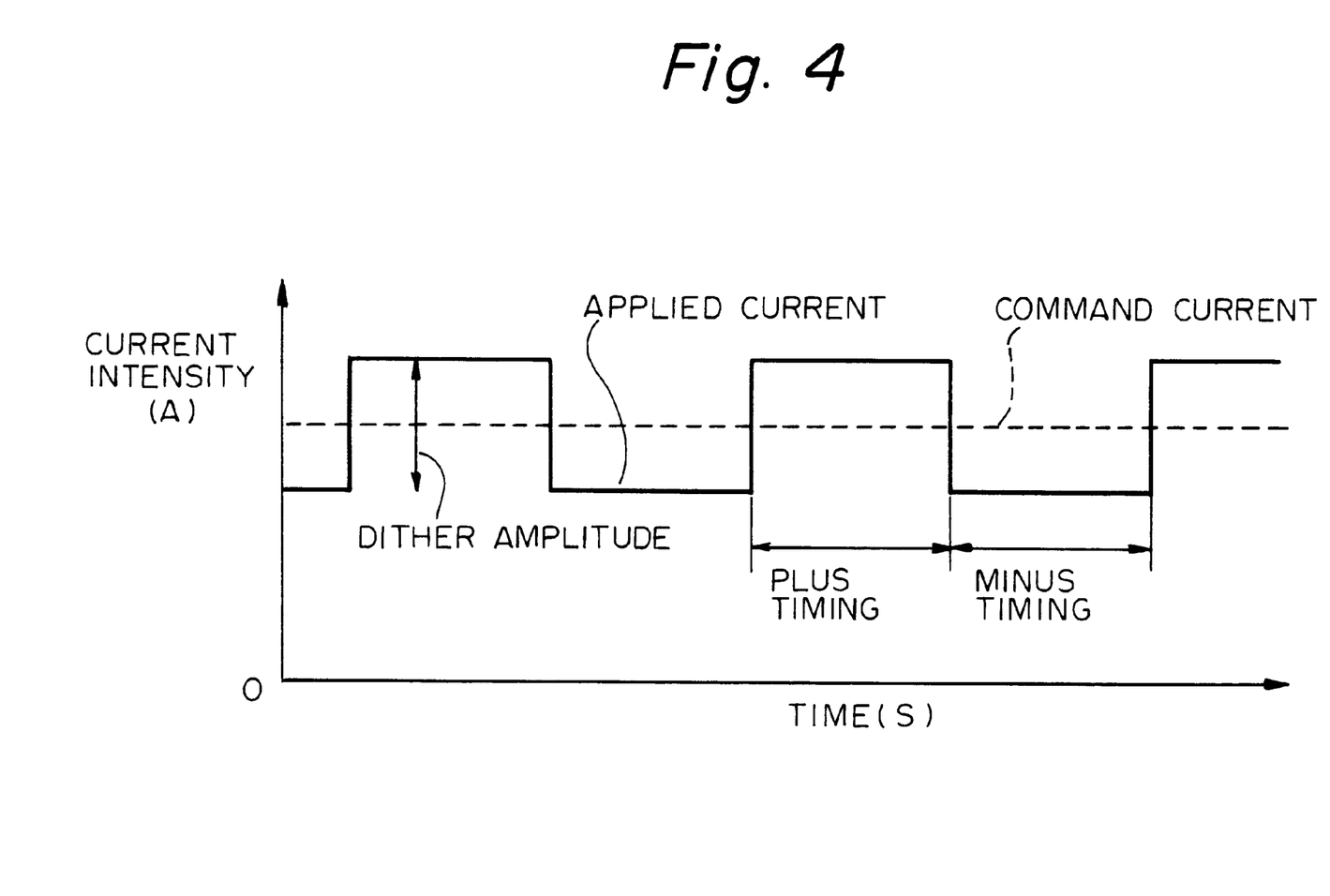
FIG. 4 shows a typical example of a relationship between a command current, a dithering current and an output current in the suspension control apparatus of FIG. 1.

At a step 16, the plus timing of output of the dithering current is set, so that the timing of output of the dithering current for the subsequent control cycle (the subsequent dither controlling cycle) is plus. Then, at the step $S_3$ in the subsequent control cycle, the applied current (output current) having the intensity $I_{out}$ is outputted. The transistor 10 is controlled so that the average value of the intensity $I_{out}$ of the applied current (output current) corresponds to the intensity of the command current, to thereby obtain the applied current (output current) having the intensity as shown in FIG. 4.

In the suspension control apparatus arranged as mentioned above, in the calculations at the step 10 (calculations of the dither amplitude from the command current intensity—dither amplitude data map in the lower graph in FIG. 5), when the damping force generated by the shock absorber changes at a high rate relative to changes in intensity of the current applied to the solenoid (that is, in the second region $S_2$ or the fourth region $S_4$), the amplitude of the dithering current superimposed on the command current is determined as a small value ($D_{R1}<D$ in the second region $S_2$ and $D_{C1}<D$ in the fourth region $S_4$), so that the magnitude of variation in damping force becomes small ($F_{R1}<F_{MAX}$ in the second region $S_2$, and $F_{C1}<F_{MAX}$ in the fourth region $S_4$). Therefore, generation of undesirable noise and vibration which occurs in conventional suspension control apparatuses can be suppressed. Further, in the suspension control apparatus according to the first embodiment of the present invention, the dither amplitude is determined as a small value only in a region where the damping force generated by the shock absorber changes at a high rate relative to changes in intensity of the applied current, so that an increase in hysteresis with respect to a damping force (a lowering of responsivity in controlling a damping force) can be suppressed to a level as low as possible.

Hereinbelow, a suspension control apparatus according to the second embodiment of the present invention is explained, with reference to FIGS. 6 to 8. In FIGS. 6 to 8, the same members and portions as those in FIGS. 1 to 5, FIGS. 9 and 10 are denoted by the same reference numerals, and overlapping is avoided with respect to descriptions of those members and portions.

Figure 8:
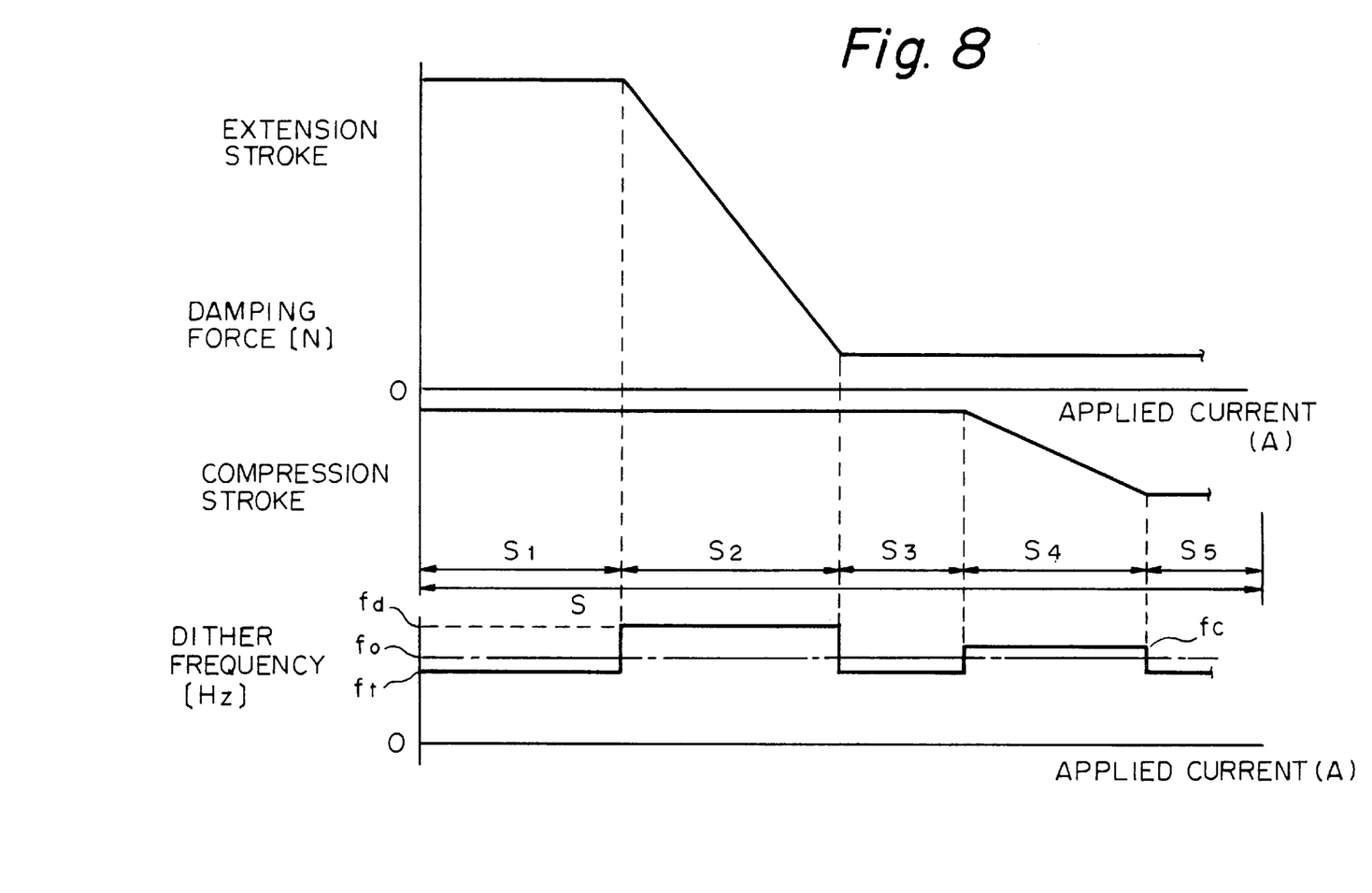
FIG. 8 shows graphs explaining an effect achieved by the second embodiment of the present invention.

The dither controlling circuit 13A (dither generating means and dither frequency setting means) stores a command current intensity—dither frequency data map shown in a lower graph in FIG. 8, which is preliminarily determined by experiments. The command current intensity—dither frequency data map is determined in a manner as mentioned below, based on the fact that the variable damping force generating shock absorber 6 has damping force characteristics relative to the intensity of command current (the average intensity of applied current) shown in an upper graph in FIG. 8.

In the second embodiment of the present invention, when the intensity of command current is in the second region $S_2$ or the fourth region $S_4$, the dither frequency is set to a frequency which is higher than the above-mentioned predetermined dither frequency $f_o$ in the conventional suspension control apparatus. For example, when the intensity of command current is in the second region $S_2$, the dither frequency is set to a frequency $f_d$ which is higher than the predetermined dither frequency $f_o$ ($f_d > f_o$). When the intensity of command current is in the fourth region $S_4$, the dither frequency is set to a frequency $f_c$ which is higher than the predetermined dither frequency $f_o$ ($f_c > f_o$) (the relationship between the dither frequencies $f_d$, $f_c$ and $f_o$ is represented by the formula $f_d > f_c > f_o$). On the other hand, when the intensity of command current is in the first region $S_1$, the third region $S_3$ or the fifth region $S_5$, the dither frequency is set to a frequency $f_t$ which is lower than the predetermined dither frequency $f_o$ ($f_t < f_o$).

In suspension control apparatuses utilizing the dithering current, hysteresis with respect to a damping force is reduced by superimposing the dithering current on the command current. In this connection, it has been known that the amount of reduction in hysteresis with respect to a damping force varies, depending on the frequency of the dithering current. That is, the lower the dither frequency, the larger the amount of reduction in hysteresis with respect to a damping force. Based on the above fact, in the second embodiment of the present invention, in the region in which the damping force generated by the shock absorber changes at a high rate relative to changes in intensity of the applied current (i.e., the second region $S_2$ and the fourth region $S_4$), the dither frequency is set to a high frequency ($f_d$ and $f_c$ in the second region $S_2$ and the fourth region $S_4$, respectively; $f_d > f_c > f_o$) and in the region other than the region in which the damping force generated by the shock absorber changes at a high rate relative to changes in intensity of the applied current (i.e., the first region $S_1$, the third region $S_3$ and the fifth region $S_5$), the dither frequency is set to a low frequency ($f_t$ in each of the first region $S_1$, the third region $S_3$ and the fifth region $S_5$; $f_t < f_o$).

The dither controlling circuit 13A utilizes the command current intensity—dither frequency data map shown in FIG. 8 in a manner as mentioned below, and conducts the following calculations in cooperation with the CPU 12, the addition circuit 14 and the current feedback circuit 15, to thereby generate a dithering current having a controlled frequency.

Figure 7:
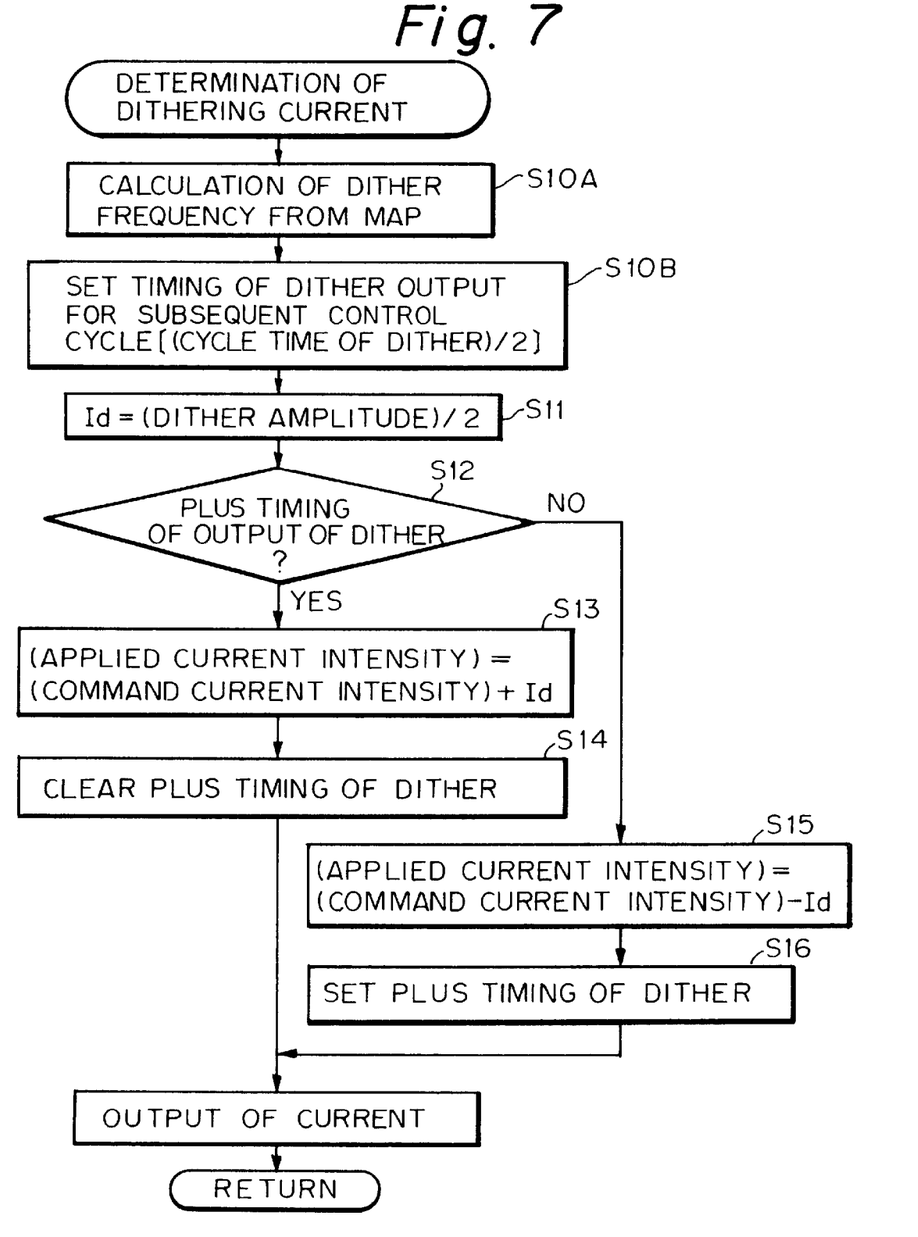
FIG. 7 is a flow chart showing the contents of calculations by a controller shown in FIG. 6.

In the second embodiment of the present invention, the controller 8 is substantially the same as the controller in the first embodiment of the present invention, except that it carries out a subroutine for generating a controlled dithering current shown in FIG. 7, instead of the subroutine for generating a controlled dithering current shown in FIG. 3.

The subroutine in FIG. 7 differs from the subroutine in FIG. 3 in that it includes a step 10A, instead of the step 10, in which the dither frequency is calculated from the map in the lower graph in FIG. 8, based on the intensity of command current determined in the step S6, and also includes a step S10B in which the timing of output of the dithering current is controlled, according to the dither frequency calculated in the step S10A, to thereby control the dither frequency.

In the suspension control apparatus arranged as mentioned above, in the calculations at the step 10A (calculations of the dither frequency from the command current intensity—dither frequency data map in the lower graph in FIG. 8), when the intensity of command current is in the region such that the damping force generated by the shock absorber changes at a high rate (i.e., the second region $S_2$ and the fourth region $S_4$), the dither frequency is determined as a high frequency ($f_d$ and $f_c$ in the second region $S_2$ and the fourth region $S_4$, respectively; $f_d > f_c > f_o$), and is controlled accordingly at the step 10B. On the other hand, when the intensity of command current is in a region other than the region such that the damping force generated by the shock absorber changes at a high rate (i.e., the first region $S_1$, the third region $S_3$ and the fifth region $S_5$), the dither frequency is determined as a low frequency ($f_t$ in each of the first region $S_1$, the third region $S_3$ and the fifth region $S_5$; $f_t < f_o$) at the step 10A, and is controlled accordingly at the step 10B.

As described above, in the second embodiment of the present invention, in each of the second region $S_2$ and the fourth region $S_4$ in which the damping force generated by the shock absorber changes at a high rate relative to changes in intensity of the applied current and therefore undesirable noise and vibration are likely to be generated, the dither frequency is set to a high frequency ($f_d$ and $f_c$ in the second region $S_2$ and the fourth region $S_4$, respectively; $f_d > f_c > f_o$), so that movement of the movable member 3 in the proportional solenoid valve 5 (followability of the movable member 3) is suppressed, to thereby prevent generation of noise and vibration. On the other hand, in each of the first region $S_1$, the third region $S_3$ and the fifth region $S_5$, the dither frequency is set to a low frequency, so that the movable member 3 easily moves (followability of the movable member 3 is improved), so that responsivity in controlling a damping force is improved (hysteresis with respect to a damping force is reduced). Accordingly, in the second embodiment of the present invention, an increase in hysteresis with respect to a damping force generated by the shock absorber is suppressed to a level as low as possible in an entire region with respect to the damping force, so that generation of noise and vibration is prevented in the entire region with respect to the damping force.

Incidentally, in the second embodiment of the present invention, the relationship between the dither frequencies $f_d$, $f_c$ and $f_t$ in the command current intensity regions are determined so as to satisfy the formula $f_d > f_c > f_o > f_t$. However, in the present invention, the relationship between the dither frequencies $f_d$, $f_c$ and $f_t$ may be determined so as to satisfy the formula $f_d = f_c > f_o > f_t$ or the formula $f_c > f_d > f_o > f_t$, as long as generation of noise and vibration is prevented in the region in which the damping force generated by the shock absorber changes at a high rate relative to changes in intensity of the applied current (the second region $S_2$ and the fourth region $S_4$).

In the first embodiment of the present invention, when the damping force generated by the shock absorber changes at a high rate relative to changes in intensity of the current applied to the solenoid, the amplitude of the dithering current to be superimposed on the command current is set to a small value, so that movement of the movable member in the proportional solenoid valve is suppressed, to thereby prevent generation of noise and vibration.

In the second embodiment of the present invention, in the region in which the damping force generated by the shock absorber changes at a high rate relative to changes in intensity of the current applied to the solenoid, the frequency of the dithering current to be superimposed on the command current is set to a high frequency, so that movement of the movable member in the proportional solenoid valve is suppressed, to thereby prevent generation of noise and vibration. On the other hand, in the region other than the region in which the damping force generated by the shock absorber changes at a high rate relative to changes in intensity of the current applied to the solenoid, the dither frequency is set to a low frequency, so that the movable member in the proportional solenoid valve easily moves and therefore hysteresis with respect to a damping force is reduced (responsivity in controlling a damping force is improved). Therefore, an increase in hysteresis with respect to a damping force generated by the shock absorber is suppressed to as low a level as possible in an entire region with respect to the damping force, so that generation of noise and vibration is prevented in the entire region with respect to the damping force.

What is claimed is:

1. A suspension control apparatus comprising:
   a proportional solenoid valve having a solenoid and a movable member, said movable member being adapted to be displaced according to an intensity of a current applied to said solenoid;
   a variable damping force generating shock absorber provided between a vehicle body and an axle to generate a damping force which varies depending on a position of said movable member;
   dither generating means for generating a dithering current to be superimposed on a command current corresponding to a desired damping force, said dithering current and said command current constituting said current applied to the solenoid and said movable member being adapted to oscillate at a position corresponding to an intensity of said command current and at an amplitude corresponding to an amplitude of said dithering current; and
   dither amplitude setting means adapted to set the amplitude of said dithering current to a small value, in a region where the damping force generated by said variable damping force generating shock absorber changes at a high rate relative to changes in intensity of said current applied to the solenoid.

2. A suspension control apparatus according to claim 1, wherein said variable damping force generating shock absorber generates a damping force in such a way that it varies to have a first region where the damping force changes at a first high rate relative to changes in intensity of the current applied to the solenoid and a second region where the damping force changes at a second high rate smaller than said first high rate relative to changes in intensity of the current applied to the solenoid, and said dither amplitude setting means is adapted to set the amplitude of the dithering current to first and second small values for said first and second regions, respectively, said first small value being smaller than said second small value.

3. A suspension control apparatus comprising:
   a proportional solenoid valve having a solenoid and a movable member, said movable member being adapted to be displaced according to an intensity of a current applied to said solenoid;
   a variable damping force generating shock absorber provided between a vehicle body and an axle to generate a damping force which varies depending on a position of said movable member;
   dither generating means for generating a dithering current to be superimposed on a command current corresponding to a desired damping force, said dithering current and said command current constituting said current applied to the solenoid and said movable member being adapted to oscillate at a position corresponding to an intensity of said command current and at a frequency corresponding to a frequency of said dithering current; and
   dither frequency setting means adapted to set the frequency of said dithering current to a high frequency, in a region where the damping force generated by said variable damping force generating shock absorber changes at a high rate relative to changes in intensity of said current applied to the solenoid and set the frequency of said dithering current to a low frequency, in a region other than the region where the damping force generated by said variable damping force generating shock absorber changes at a high rate relative to changes in intensity of said current applied to the solenoid.

4. A suspension control apparatus according to claim 3, wherein said variable damping force generating shock absorber generates a damping force in such a way that it varies to have a first region where the damping force changes at a first high rate relative to changes in intensity of the current applied to the solenoid and a second region where the damping force changes at a second high rate smaller than said first high rate relative to changes in intensity of the current applied to the solenoid, and said dither frequency setting means is adapted to set the frequency of the dithering current to first and second high frequencies for said first and second regions, respectively, said first high frequency being higher than said second high frequency.

5. A method of controlling a suspension system comprising:
   a proportional solenoid valve having a solenoid and a movable member, said movable member being adapted to be displaced according to an intensity of a current applied to said solenoid;
   a variable damping force generating shock absorber provided between a vehicle body and an axle to generate a damping force which varies depending on a position of said movable member; and
   dither generating means for generating a dithering current to be superimposed on a command current corresponding to a desired damping force, said dithering current and said command current constituting said current applied to the solenoid and said movable member being adapted to oscillate at a position corresponding to an intensity of said command current and at an amplitude corresponding to an amplitude of said dithering current, said method comprising a step of changing the amplitude of said dithering current depending on the rate at which the damping force generated by said variable damping force generating shock absorber changes relative to changes in intensity of said current applied to the solenoid so that the amplitude of the variation of the damping force caused by the dithering current is suppressed in a predetermined allowable range.

6. A method of controlling a suspension system comprising:
   a proportional solenoid valve having a solenoid and a movable member, said movable member being adapted to be displaced according to an intensity of a current applied to said solenoid;
   a variable damping force generating shock absorber provided between a vehicle body and an axle to generate a damping force which varies depending on a position of said movable member; and
   dither gathering means for generating a dithering current to be superimposed on a command current corresponding to a desired damping force, said dithering current and said command current constituting said current applied to the solenoid and said movable member being adapted to oscillate at a position corresponding to an intensity of said command current and at a frequency corresponding to a frequency of said dithering current, said method comprising a step of changing the frequency of the dithering current depending on the rate at which the damping force generated by said variable damping force generating shock absorber changes relative to changes in intensity of said current applied to the solenoid so that the amplitude of the variation of the damping force caused by the dithering current is suppressed in a predetermined allowable range.

* * * * *